(12) United States Patent
Pirro

(10) Patent No.: US 7,189,160 B2
(45) Date of Patent: Mar. 13, 2007

(54) DEVICE FOR ADJUSTING THE CUTTING LENGTH OF A CHOPPING DEVICE

(75) Inventor: Peter Pirro, Wallhalben (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/434,871

(22) Filed: May 9, 2003

(65) Prior Publication Data

US 2003/0217538 A1  Nov. 27, 2003

(30) Foreign Application Priority Data

May 10, 2002  (DE)  ................. 102 20 699

(51) Int. Cl.
*A01D 75/18* (2006.01)
*A01F 12/16* (2006.01)
*A01F 21/00* (2006.01)

(52) U.S. Cl. ........................ 460/7; 56/10.2 B

(58) Field of Classification Search .................. 56/60, 56/10.2 B, 10.2 G; 460/70, 7, 27, 134
See application file for complete search history.

(56) References Cited

U.S. PATENT DOCUMENTS

| | | | |
|---|---|---|---|
| 3,945,175 A | 3/1976 | Barkstrom et al. .......... 56/10.8 |
| 5,901,535 A * | 5/1999 | Duckinghaus et al. ... 56/10.2 G |
| 5,991,025 A | 11/1999 | Wright et al. .............. 356/328 |
| 6,421,990 B1 * | 7/2002 | Ohlemeyer et al. ...... 56/10.2 R |
| 6,584,755 B2 * | 7/2003 | Holtkotte ................. 56/10.2 B |
| 2001/0037638 A1 * | 11/2001 | Krone et al. .................. 56/504 |

FOREIGN PATENT DOCUMENTS

| | | |
|---|---|---|
| DE | 196 06 388 A1 | 8/1997 |
| DE | 196 32 977 A1 | 2/1998 |
| DE | 639 14 330 T2 | 2/1998 |
| DE | 196 48 126 A1 | 5/1998 |
| DE | 198 12 500 | 9/1999 |
| DE | 100 21 659 A1 | 11/2001 |
| DE | 100 21 663 A | 11/2001 |
| EP | 0 843 959 A1 | 5/1998 |
| EP | 1 053 671 A | 11/2000 |
| EP | 1 166 619 A | 1/2002 |

* cited by examiner

*Primary Examiner*—Árpád Fábián Kovács

(57) ABSTRACT

It is proposed that a sensor ascertain a parameter of the harvested crop and send a signal used for changing the speed of feeding devices for the chopping and/or the speed of the chopping device in order for automatically obtaining a change in the length of the cut of the chopping device.

9 Claims, 2 Drawing Sheets

DEVICE FOR ADJUSTING THE CUTTING LENGTH OF A CHOPPING DEVICE

FIELD OF THE INVENTION

The invention pertains to a device for adjusting the cutting length of a chopping device.

BACKGROUND OF THE INVENTION

Field choppers employed in agriculture are used for cutting and picking up harvested crops, for example, grass or corn, which is normally used as fodder for cattle. To promote the digestibility of the fodder, the cut length of the harvested crop is very important. In current field choppers, means have therefore been proposed for adjusting the cutting length of the chopping device wherein hydraulic motors, adjustable either continuously or in steps or shifting transmissions have been used. The operator of the field chopper, however, must make the decision about the cutting length, and in this regard must employ his experience or take other factors into consideration. It is possible that poor cutting lengths will be selected, in particular in the case of inexperienced operators or under unsuitable conditions.

The problem underlying the invention is that of relieving the field chopper operator of the task of adjusting the cutting length.

SUMMARY OF THE INVENTION

According to the present invention, there is provided an improved arrangement for adjusting the cutting length of a chopping device.

An object of the invention is to provide an improved cutting length adjusting arrangement wherein a sensor is provided to ascertain one parameter of the crop to be harvested, and to adjust the cutting length of the chopping device as a function of the measured parameter. In one simple embodiment, the measurement value of the sensor, and/or of a cutting length derived from it, is displayed, and the operator will adjust the cutting length accordingly. In one preferred embodiment, the cutting length of the chopping device will be adjusted automatically to a value derived from the measurement value from the sensor.

In this manner an optimum digestibility will be obtained, regardless of the properties of the chopped crop. Thus, an optimum utilization of the nutritional value of the harvested crop will be obtained when it is used as animal fodder.

For example, the sensor can determine the moisture content of the chopped crop. As a moisture sensor, in particular a microwave sensor, a capacitive sensor, or a conductivity sensor can be used. However, any other kind of sensor suitable for moisture measurement can be used. If the chopped crop is relatively moist and thus more easily digested, then a greater cutting length would be adjusted than in the case of dry chopped material.

But instead of, or in addition to moisture, the nutrient content of the crop can be measured, for instance, as determined by an appropriate sensor, as disclosed for example in U.S. Pat. No. 5,991,025. Also, the grain content can be measured optically. Other constituents of the chopped crop can also be ascertained.

The cutting length can be adjusted by a suitable control device, which may be either separate or integrated into the existing onboard electronics systems. This is linked with the sensor and controls the cutting length according to its measurement value. The cutting length can be adjusted by changing the rotational speed of a chopping drum and/or by variation in the speed with which the harvested crop is delivered to the chopping drum. As a rule, the second variant will be used, wherein the rotational speed of the front press rollers will be varied by means of an electric motor or hydraulic motor. In this case, a portion of the drive power of the front press rollers can be employed mechanically. Basically, however, it would also be possible to vary the rotational speed of the chopper drum, which can be done by adjusting the rotational speed of the drive motor.

In a preferred embodiment, the control device is connected to a memory unit in which information concerning the cutting length and the rotational speed of the chopper drum and/or of the front press rollers is stored as a function of the measurement values of the sensor, e.g., in the form of a table, a database or mathematical curves or functions. This information can be derived from fodder tests or other sources.

BRIEF DESCRIPTION OF THE DRAWINGS

The figures show one embodiment of the invention, which is described in greater detail below.

DESCRIPTION OF THE PREFERRED EMBODIMENT

Figure 1:
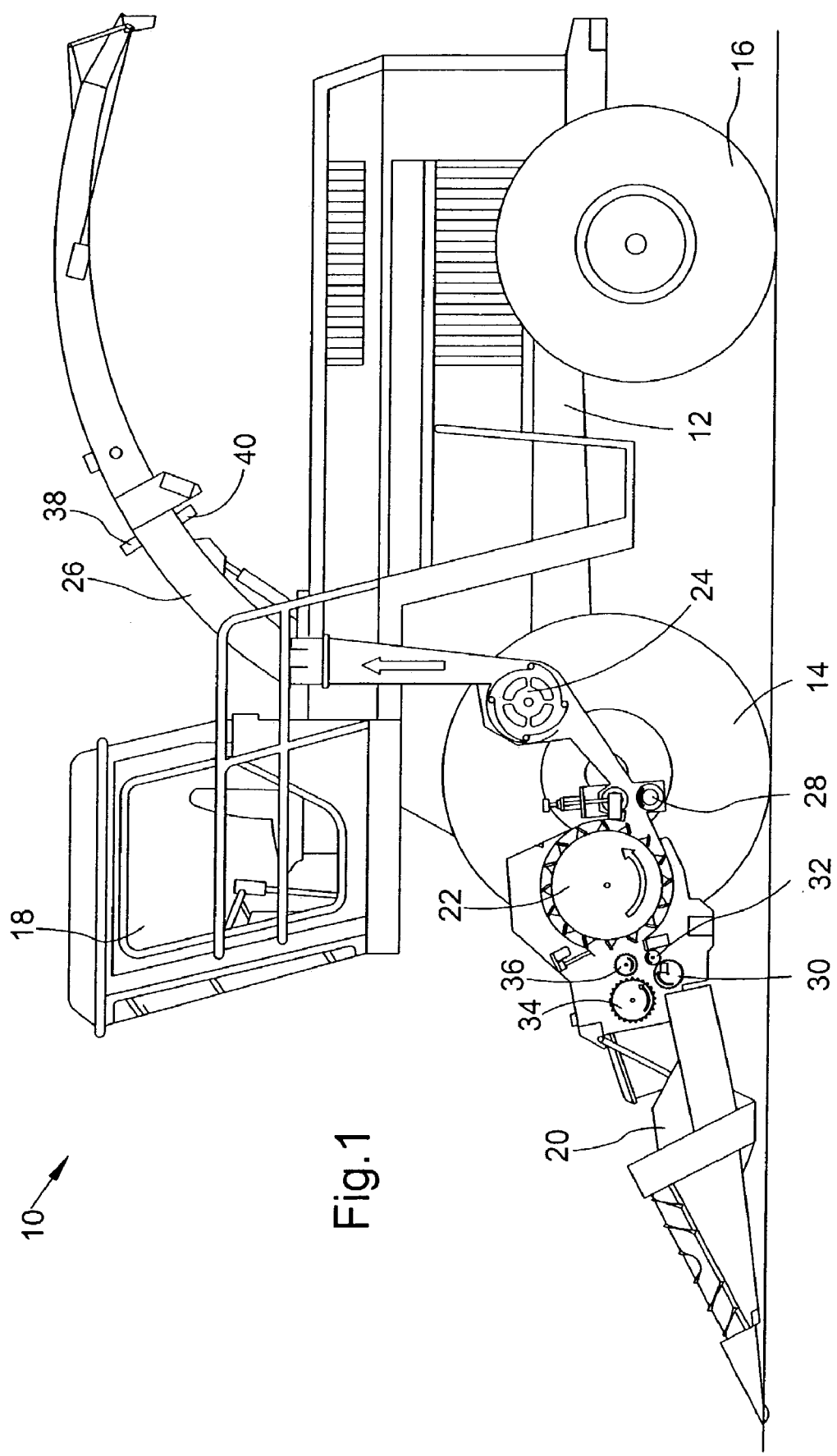
FIG. 1 is a schematic, left side elevational view of a harvesting machine with which the present invention is particularly adapted for use.

Referring now to FIG. 1, there is shown a harvesting machine 10, illustrated as a type of self-propelled field chopper including a main frame 12 supported on front and rear wheels 14 and 16. The harvesting machine 10 is operated from a driver's cab 18, from which a harvested material pickup device 20 is visible. The crop, e.g., corn, grass or the like, picked up from the ground by the harvested material pickup device 20, is moved through four front press rollers 30, 32, 34, 36 to a chopper drum 22, which chops the crop into small pieces and sends it to a conveyor unit 24. The material passes from the harvesting machine 10 to a side trailer via a discharge chute 26, which may be adjusted about an upright axis. Located between the chopper drum 22 and the conveyor unit 24 is a post-comminution device including two cooperating rollers 28, which act to feed the conveyed material tangentially to the conveyor unit 24.

Figure 2:
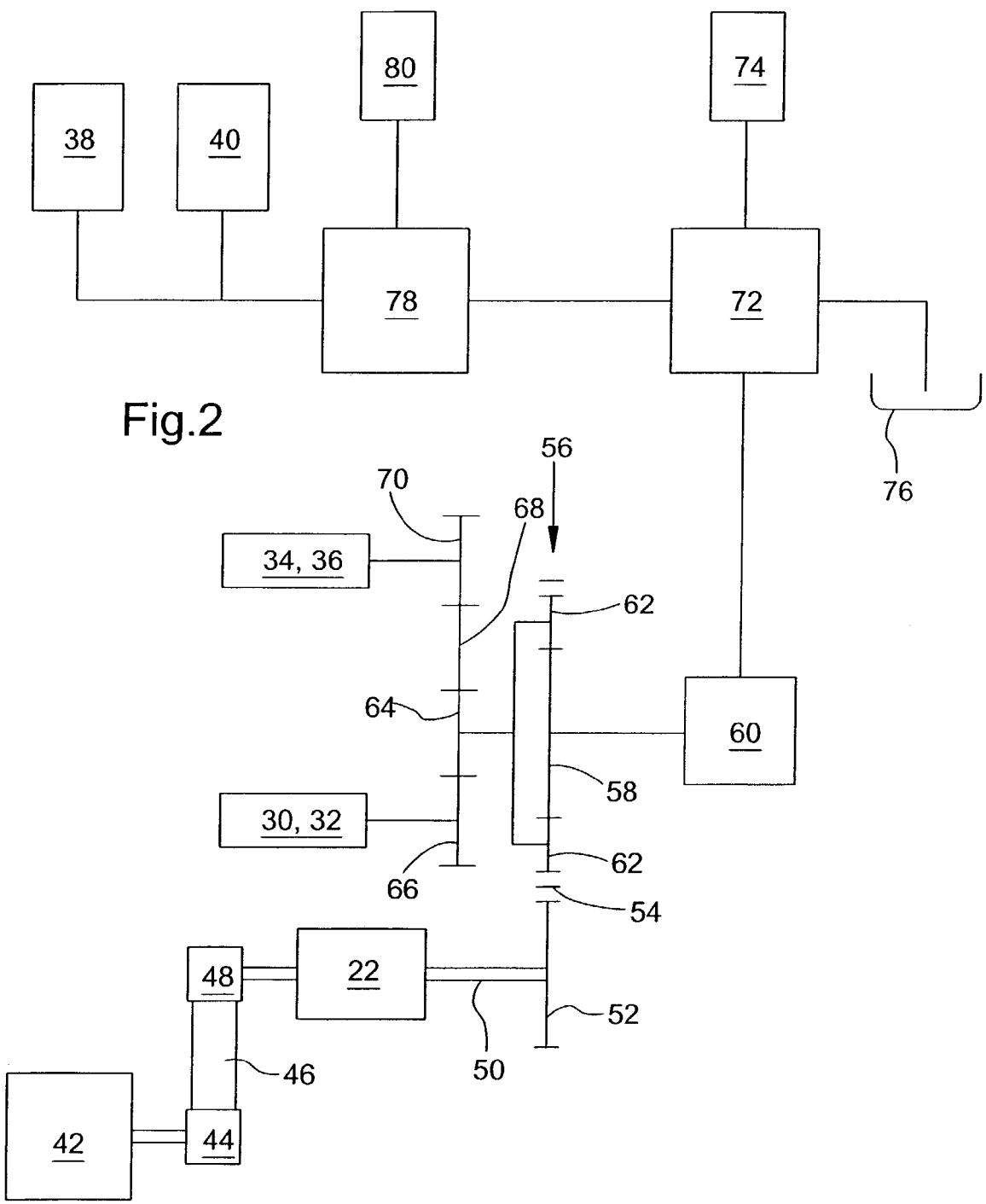
FIG. 2 is a schematic illustration of the device for effecting automatic adjustment of the cutting length.

According to the present invention, a device for automatic adjustment of the cutting length is provided which relieves the driver of the task of adjusting the cutting length to a value at which the chopped crop will be best suited as fodder for animals. The cut length of the chopped crop that is ejected from the discharge chute 26 depends on the rotating speed of the front press rollers 30–36, on the speed of the chopper drum 22, and on the number of blades attached to the chopper drum 22. FIG. 2 shows a detailed illustration of the drive unit for the chopper drum 22 and the front press rollers 30–36, and the device for automatic adjustment of the cutting length.

An internal combustion engine 42 operating at constant speed, while in a harvest mode, drives a transmission belt 46 via a pulley 44 which includes a disengageable coupling. The transmission belt 46, in turn, drives a pulley 48 coupled to the chopper drum 22. The chopper drum 22 includes a solid shaft 50 which drives a cogwheel or gear 52 which is meshed with a ring gear 54 of a planetary gear train 56. The planetary gear train 56 includes a sun wheel 58 coupled to a hydraulic motor 60. Planet gears 62 of the planetary gear train 56, are coupled via a planet carrier with a cogwheel or gear 64 that drives the lower front press rollers 30, 32 via an additional cogwheel or gear 66, and drive the upper front press rollers 34, 36 in a direction opposite that of the lower front press rollers, via additional cogwheels or gears 68 and 70. Due to this configuration, the chopper drum 22 is driven at a constant rotational speed. The rotational speed of the front press rollers 30–36 depends on the rotational speed and direction of the hydraulic motor 60.

The hydraulic motor 60 is connected, by a valve unit 72, to a pressurized hydraulic fluid source 74 and to a hydraulic fluid supply tank 76. The valve unit 72 is connected electrically to a control device 78 that can be actuated to control the valve unit 72 such that the hydraulic motor 60 will rotate at a rotational speed and direction specified by the control unit 78. The control unit 78 is thus set up for continuous adjustment of the cutting length of the ejected material.

The device for automatic adjustment of the cutting length also comprises a sensor to measure the properties of the crop. In the illustrated embodiment, this sensor is a moisture sensor that is constructed from a microwave transmitter 40 and a microwave receiver 38. The moisture sensor is mounted on the discharge chute 26 and operates via transmission, i.e., by transmitting radiation through the crop material passing through the discharge chute 26. Details on the design and operation of this kind of moisture sensor are disclosed in DE 196 48 126 A, whose teaching is hereby incorporated by reference into the present application. The control device 78 is connected to the microwave transmitter 40 and the microwave receiver 38. Based on the signals received from the microwave receiver 38, the control device 78 evaluates the moisture content of the chopped crop. It then takes, from a memory unit 80, a value for an optimal cutting length corresponding to the measured moisture content, and controls the valve unit 72 accordingly. The cutting length values might originate from tests or from experienced experts. In general, the cutting length will be greater the more moisture is contained in the chopped material. The memory unit 80 contains a table or database in which the cutting lengths or the rotational speed of the hydraulic motor 60, as a function of the moisture in the harvested crop, are saved. Any intermediate values could be computed by interpolation. The use of algorithms, i.e., mathematic functions, would also be possible. Thus, even in the event of changes in the moisture of the harvested crop during the harvesting process, an optimal cutting length will be achieved without any delay and without manual intervention by the operator.

It should be mentioned that different modifications to the invention are possible. For example, it would be possible to use any type of moisture sensor instead of, or in addition to, the microwave sensor 38, 40, such as, for example, a capacitive sensor, an optical sensor, or a conductivity sensor. The sensor can also be located at a point on the harvesting machine 10 between the chopper drum 22 and the rotating track of the discharge chute 26, or upstream from the chopper drum 22. Furthermore, any other sensors can be used, alternatively or additionally, that ascertain the moisture or other parameters of the harvested crop, and whose signals can be used for adjusting of the cutting length. For example, the protein content of the chopped crop could be measured by a sensor operating in the near-infrared range. Based on the measurement value of the parameter and on information saved in the storage unit 80, the cutting length could again be adjusted accordingly. If several sensors are used that measure different parameters of the chopped crop, then the control unit 78 will take from the storage unit 80 a cutting length value which best fits with the combination of measured parameters.

In certain cases, automatic adjustment of the cutting length can be switched off by an operator in the cab 18 and replaced with a manual setting.

Having described the preferred embodiment, it will become apparent that various modifications can be made without departing from the scope of the invention as defined in the accompanying claims.

The invention claimed is:

1. A method for operating a crop harvester including a chopping drum for cutting harvested crop into short lengths, comprising the steps of:
   determining optimal cut length for particular crop parameters including moisture content based upon testing;
   storing information relating to the optimal cut length for particular crop parameters including moisture content;
   sensing at least a moisture content of the crop being harvested;
   generating a control signal relating to the moisture content and the stored optimal cut length for the moisture content; and,
   automatically adjusting a component of the crop harvester in response to the control signal, whereby the length into which crop is cut by the chopping drum is a function of the moisture content.

2. A method for operating a crop harvester according to claim 1 comprising the further steps of:
   sensing at least one additional different crop parameter;
   determining from the stored information the cut length which best fits a combination of the moisture content and the at least one additional sensed parameter;
   automatically adjusting the component based upon the determined best cut length.

3. A method for operating a crop harvester according to claim 1 wherein the component is responsive to the control signal reflective of an increasing moisture content to effect a slower feed arrangement or chopping drum drive speed, thus resulting in the cutting length increasing as the moisture of the harvested crop increases, and vice-versa.

4. A method for operating a crop harvester including a chopping drum for cutting harvested crop into short lengths, comprising the steps of:
   determining optimal cut length for particular crop parameters;
   storing information relating to the optimal cut length for particular crop parameters;
   sensing a plurality of parameters of the crop being harvested, wherein one of the plurality of parameters is moisture content;
   generating a control signal relating to the sensed parameters and the stored optimal cut length that best fits the combination of sensed parameters; and,
   automatically adjusting a component of the crop harvester in response to the control signal, whereby the length into which crop is cut by the chopping drum is a function of the plurality of sensed crop parameters.

5. A method for operating a crop harvester according to claim 4 wherein the component is responsive to the control signal reflective of an increasing moisture content to effect a slower feed arrangement or chopping drum drive speed, thus resulting in the cutting length increasing as the moisture of the harvested crop increases, and vice-versa.

6. In combination with a crop harvester including a chopping drum for cutting harvested crop into short lengths, a crop feed arrangement for feeding the harvested crop to the chopping drum, a drive arrangement for driving the crop feed arrangement, and the chopping drum and including at least one adjustable component for driving one of the crop feed arrangement or chopping drum at a variable speed so as to change the length into which the harvested crop is cut, a control device for selectively adjusting said adjustable component, comprising:

a storage unit wherein optimal cutting length values for particular crop parameters are stored;

a first crop parameter sensor for ascertaining a first parameter of the crop being harvested, wherein the first parameter is one of: moisture content or protein content;

a second crop parameter sensor for ascertaining a second parameter of the crop being harvested wherein the control device takes from the storage unit a cutting length value which best fits with a combination of the ascertained parameters and generates a control signal;

the adjustable component being coupled to the control device and responsive for automatically being adjusted an amount corresponding to the control signal, whereby the length into which crop is cut by the chopping drum is a function of the sensed crop parameters.

7. A method for operating a crop harvester including a chopping drum for cutting harvested crop into short lengths, comprising the steps of:

determining optimal cut length for particular crop parameters including protein content based upon testing;

storing information relating to the optimal cut length for particular crop parameters including protein content;

sensing at least a protein content of the crop being harvested;

generating a control signal relating to the protein content and the stored optimal cut length for the protein content; and, automatically adjusting a component of the crop harvester in response to the control signal, whereby the length into which crop is cut by the chopping drum is a function of the protein content.

8. A method for operating a crop harvester according to claim 7 comprising the further steps of:

sensing at least one additional different crop parameter;

determining from the stored information the cut length which best fits a combination of the protein content and the at least one additional sensed parameter; automatically adjusting the component based upon the determined best cut length.

9. A method for operating a crop harvester including a chopping drum for cutting harvested crop into short lengths, comprising the steps of:

determining optimal cut length for particular crop parameters;

storing information relating to the optimal cut length for particular crop parameters;

sensing a plurality of parameters of the crop being harvested, wherein one of the plurality of parameters is protein content;

generating a control signal relating to the sensed parameters and the stored optimal cut length that best fits the combination of sensed parameters; and, automatically adjusting a component of the crop harvester in response to the control signal, whereby the length into which crop is cut by the chopping drum is a function of the plurality of sensed crop parameters.

* * * * *